(No Model.)

M. L. KEACH.
VEGETABLE SLICER.

No. 368,092. Patented Aug. 9, 1887.

Witnesses:
J. H. Shumway
Fred C. Earle

Melbourne L. Keach,
Inventor,
By Atty.

UNITED STATES PATENT OFFICE.

MELBOURNE L. KEACH, OF WATERVILLE, CONNECTICUT.

VEGETABLE-SLICER.

SPECIFICATION forming part of Letters Patent No. 368,092, dated August 9, 1887.

Application filed May 16, 1887. Serial No. 238,291. (No model.)

*To all whom it may concern:*

Be it known that I, MELBOURNE L. KEACH, of Waterville, in the county of New Haven and State of Connecticut, have invented a new Improvement in Vegetable-Slicers; and I do hereby declare the following, when taken in connection with accompanying drawings and the letters of reference marked thereon, to be a full, clear, and exact description of the same, and which said drawings constitute part of this specification, and represent, in—

Figure 1:
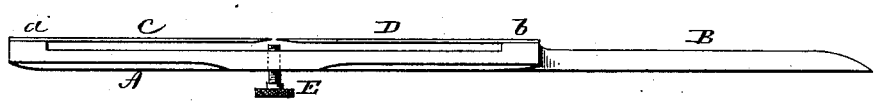
Figure 2:
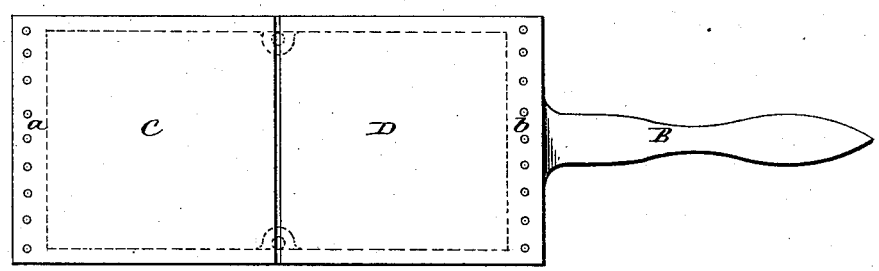
Figure 3:
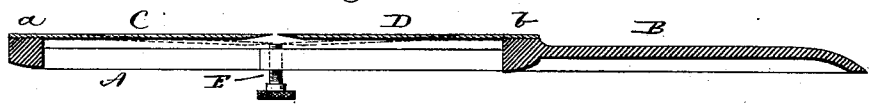
Figure 4:
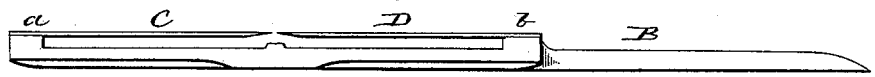

Figure 1, a side view of the slicer complete; Fig. 2, a top view of the same; Fig. 3, a longitudinal central section; Fig. 4, a side view showing stationary stops.

This invention relates to an improvement in devices for cutting fruit and vegetables into thin slices, commonly called "vegetable-slicers," the object of the invention being a simple construction in which the thickness of the cut may be readily adjusted and the work rapidly performed.

A represents the frame, which is best made from cast metal, and from one end a handle, B, projects, by which the instrument may be held in one hand, while the other holds the fruit or vegetable to be cut.

On one end of the frame a flat thin sheet-metal cutter, C, is secured, as at $a$, the cutter projecting to about midway of the length of the frame, but free from its point of connection for up-and-down movement. At the opposite end of the frame a second and like cutter, D, is secured, as at $b$. This second cutter extends toward and terminates near the edge of the cutter C, their two edges being sharp and parallel. These cutters are elastic, but are secured to the frame so that in their normal condition they stand in the same plane as seen in Fig. 1, but so that either may be depressed, as indicated in broken lines, Fig. 3. Through the side of the frame, and at a point below the adjacent edges of the cutters, an adjusting-screw, E, is introduced, one each side of the frame, the frame being open beneath the cutters, as indicated by broken lines, Fig. 2. These screws adjust the point to which the cutters may be depressed, and thereby govern the thickness of the slice to be cut.

In operation, when the stops are properly adjusted—say as indicated in Fig. 3—the operator, taking the slicer in one hand and the fruit or vegetable in the other, places such fruit or vegetable upon one cutter, C, and presses it down until that cutter comes to a bearing upon the screw—say as indicated in broken lines at the left in Fig. 3—and independent of the other cutter, then draws the vegetable toward the handle. In doing so it meets the edge of the cutter D, and, passing onto that cutter, cuts a slice equal to the distance to which the first cutter was depressed. The slice, passing beneath the cutter D, drops through the frame. Then after the vegetable has passed onto the cutter D and escaped the cutter C, the pressure thereon will cause the cutter D to descend onto the stops, while the cutter C will rise. Then under such pressure upon the vegetable it is forced against the cutter C and a slice cut in that direction, the slice passing down beneath the cutter C in like manner as the previous slice did below the cutter D, and, so continuing, the vegetable is moved from the surface of one cutter onto the surface of the next under such compression, the cutters alternately dropping and rising, so as to present the cutting-edge to the advancing vegetable to take a slice therefrom.

The thickness of the cut will be adjusted by the set-screws, or the stops may be stationary for a standard cut, as seen in Fig. 4. Under this construction the work is very rapidly performed. The instrument is very cheap, not liable to get out of repair, and the cutters are easily sharpened by inverting the frame so as to expose the bevels of the cutters.

I claim—

1. The herein-described vegetable-slicer, consisting of the frame having two flat elastic plate cutters, one secured to one end of the frame and the other secured to the opposite end of the frame, the two cutters extending toward each other to a point midway of the frame, and so as to stand free from their points of connection, combined with stops below said cutters, substantially such as described, said stops being adapted to support first one cutter while the other is free, and then the second cutter while the first is free.

2. The combination of a frame, A, constructed with a handle, B, projecting from one end, an elastic plate cutter, C, secured to one end of the frame, and a like plate cutter, D, secured to the opposite end of the frame, the two cutters extending toward each other, their cutting-edges nearly meeting midway of the frame, with adjustable stops beneath said cutters, whereby the depression of said cutters may be regulated, substantially as and for the purpose described.

MELBOURNE L. KEACH.

Witnesses:
GEORGE H. TOD,
PETER F. MCCONNELL.